Patented Oct. 10, 1933

1,929,450

UNITED STATES PATENT OFFICE 1,929,450

METHOD OF PRODUCING MILK POWDER

Anthony R. Sanna, Minneapolis, Minn.

No Drawing. Application May 8, 1931
Serial No. 536,081

3 Claims. (Cl. 99—5)

This invention is directed to a milk powder product and a process for producing the same, wherein by reason of a relatively large proportion of alkali albuminoid or protein and the relatively small proportion of sugar content, the product is unusually resistant to deterioration and possesses remarkably high absorptive properties.

It has been heretofore proposed to treat lacteal fluids for the development of the milk solids, such as casein and other albuminoids, wherein, for example, as described in my patent issued April 25, 1922, #1,414,214, the caseins and albuminoids are brought to a state of adherence and subjected to acid treatment, with the result of a precipitation of the casein and a coagulation of the other albumin elements.

As this described process is utilized for the development of the product of the present application, with the process of that patent further enlarged, the process of the present application leading to the product to be claimed will be described more or less fully.

The lacteal fluid is subjected to a heat treatment to a predetermined degree, for example to a temperature above 150° F., with the result of bringing the casein and other albuminoids into a substantial state of adherence. As the casein is comparatively hard and softens under the action of heat, and the remaining albuminoids comparatively soft and harden under the action of heat, the heat treatment will result in a substantially similar physical condition of these elements. If at this stage of the treatment an acid is added, there results a coagulation of the homogenous mass of albuminoids, casein and butter fats, the coagulants rising to the surface or precipitating, or in part rising to the surface and in part precipitating. In any event, under this treatment there is a distinct separation of the albuminoids, casein and butter fats, permitting the convenient withdrawal of the whey containing the undesirable constituents, such as the inorganic salts and sugar content.

The resultant product is an acidulated mass which is completely insoluble, and to this extent the process leading to the production of this mass is well known as a result of the disclosure of my patent before mentioned.

In preparing for the reduction of the mass to a milk powder, it is essential that without other disturbance in the physical qualifications of the mass, such mass must be rendered soluble. To effect this, the mass produced as a result of the above process is treated with an alkali, such for example as sodium hydroxide, to not only neutralize the acid condition of the mass but to render such mass positively though slightly alkaline. Under this treatment, the mass becomes soluble and is then subjected to any of the well known desiccating processes, such as treatment over heated rollers, spraying or the like in powder boxes for the production of the desiccated product.

The resultant product, while possessing a high absorptive property, cannot be reconverted into milk, as can the ordinary milk powder, is not subject to deterioration, and possesses a remarkably high protein proportion which naturally gives it a high food value.

An analysis of the product thus produced shows the following:—

| | |
|---|---|
| Moisture | 5.49 |
| Ash | 9.95 |
| Protein | 60.05 |
| Fat | .40 |
| Lactose (milk sugar) | 23.69 |

The product by reason of its security against deterioration is capable of being shipped for long distances and kept for longer periods, and by reason of its high absorptive properties is admirably adapted for use in other food products where such fillers, particularly when constituting a food product in themselves, are of great importance such, for example, as ice cream, marshmallows, pastry making and the like. The essential characteristic of the product is its unusually large proportion of albuminates, its low proportion of sugar content, and its slight but positive alkalinity, to thus afford a milk powder which presents a maximum food value.

In order to show the particular advantage of the product, a typical ice cream formula will be taken in the following examples, Formula #1 including a typical mix having a milk solid content in the same proportion as that of Formula #2, the latter formula, however, using the improved product in part:—

| Formula #1 | Formula #2 |
|---|---|
| 14.00% butter fats<br>15.00% sugar<br>12.00% serum solids<br>.50% gelatin | 14.00% butter fats<br>15.00% sugar<br>10.00% serum solids<br>2.00% protein product<br>.50% gelatin |
| 41.50% total solids | 41.50% total solids |

In each of the formulas, there is 41.50% total solids, leaving 58.50% liquid content. The sugar content requires half its weight in liquid in the remaining solution, thus leaving 51% of the liquid content to maintain the milk sugar of the serum solids in solution. Other serum solid is lactose or milk sugar so that in the Formula #1 there is 6% of lactose, while in Formula #2 there is 5% of lactose due to the serum solids, and as the percentage of lactose in the protein product of this application is .23% and as there is 2% of protein product in Formula #2, there is introduced into Formula #2 by the protein product an additional lactose or milk sugar content of .46%. This added to the 5% milk sugar of Formula #2 incident to the 10% of serum solids shows 5.46% of lactose or milk sugar in Formula #2.

It is, of course, well known that in order to maintain lactose or milk sugar in solution, a quantity of liquid equaling nine times by weight that of the milk sugar is necessary. As Formula #1 has 6% of milk sugar, there will be required 54% of liquid to maintain this milk sugar in solution, but as appears from above there is but 51% of liquid available for this purpose. Hence the mix under Formula #1 will crystallize and is, therefore, completely unsatisfactory. With Formula #2, however, in which the milk solids are exactly in the same proportion as in Formula #1, except that a proportion of the protein product of this invention is introduced as a part of the milk solids, it has been shown that there is but 5.46% of lactose or milk sugar. As nine parts of liquid are necessary to maintain the milk sugar in solution, this milk sugar content of Formula #2 requires 49.14% of liquid. There is available, however, in Formula #2, exactly as in Formula #1, 51% of liquid, but as only 49.14% is required in Formula #2, it is apparent that the milk sugar or lactose of Formula #2 will be maintained in solution and will not crystallize.

The above is a simple example indicating that of the two formulas in which the milk solids are in the same proportion, that using the conventional milk solids does not present a commercial formula incident to its crystallization, while that including a proportion of the protein product of the present invention is completely commercial in all respects. Of course, if the proportion of the protein product in Formula #2, for example, were increased with a decrease of the conventional milk solids, a larger proportion of milk solids could be introduced into the formula, materially increasing the body of the product, while in order to present a conventional formula outlined in Formula #1, the serum solids or milk solids would have to be decreased, though it would, of course, weaken the body of the ice cream.

This is merely a typical example showing how the proportion of milk solids in an ice cream mix can be materially increased in proportion through the use of the protein product of this application as compared with the possibility of the usual serum solids or milk solids as now present in the ice cream mix. Furthermore, the product of the present invention in the large proportion of protein present naturally lends itself to a very much more rapid freezing incident to the well known properties of the casein and albuminoids in this particular. Again, the alkalinity of the product which, while comparatively slight, is nevertheless positive, also tends, as is well known, to a more effective permissible whipping of a mix when the product is employed, and as these characteristics of rapid freezing and effective whipping are important essentials in ice cream making, it will be apparent that the product not only possesses the characteristics of permitting a particular mix to contain a larger proportion of milk solids without crystallization than has been heretofore possible, but when used insures a very much more rapid freezing and a more effective and permanent whipping than is possible with any conventional mix employing the usual serum solids to an extent permissible without resultant crystallization.

Of course, the product in its important characteristics of stability and highly absorptive properties has important advantages in other arts, and while such need not be specifically referred to herein, it is to be understood that they are contemplated by applicant as important results of the process and product described in this application.

I claim:—

1. A process for the production of an incontrovertible milk powder consisting in treating the lacteal fluid to bring the caseins and other albuminoids into a state of adherence, coagulating the albuminoids and casein through the introduction of an acid, separating the coagulants, rendering the mass alkaline to a degree to convert it from an insoluble mass to a soluble mass, and desiccating the mass.

2. A process for the production of an incontrovertible milk powder consisting in treating the lacteal fluid to soften the casein and harden the remaining albuminoids until such casein and other albuminoids reach a substantially similar physical condition, coagulating the homogenous mass of albuminoids, casein and butter fats of the fluid by the addition of acid, separating the coagulants, and introducing an alkali in sufficient proportion to neutralize the acid and render the mass slightly alkaline to thereby convert the previous insoluble acid mass to a soluble alkaline mass, and desiccating the mass.

3. A process for the production of an incontrovertible milk powder consisting in treating the lacteal fluid to soften the casein and harden the remaining albuminoids until such casein and other albuminoids reach a substantially similar physical condition, coagulating the homogenous mass of albuminoids, casein and butter fats of the fluid by the addition of acid, separating the coagulants, introducing sodium hydroxide in sufficient proportion to neutralize the acid and render the mass slightly alkaline to thereby convert the previous insoluble acid mass to a soluble alkaline mass, and desiccating the mass.

ANTHONY R. SANNA